Patented July 28, 1942

2,290,946

UNITED STATES PATENT OFFICE 2,290,946

FORMALDEHYDE-UREA ADHESIVE

William C. Dearing and Kenneth D. Meiser, Toledo, Ohio

No Drawing. Application August 1, 1940,
Serial No. 349,303

3 Claims. (Cl. 260—9)

The invention relates to formaldehyde-urea adhesives, and particularly to an adhesive in the form of a finely divided mixture that is free from lumping.

An aqueous solution of a formaldehyde-urea reaction product is valuable as an adhesive because the reaction product in such a solution can be caused to become insoluble after the adhesive has been applied, to produce a water-resistant bond. A formaldehyde-urea reaction product in aqueous solution is superior to other resin-formers in the ease and rapidity with which it can be converted into the insoluble state after being applied. Plywood that has been glued with an aqueous solution of a formaldehyde-urea reaction product, unlike plywood that has been glued with other thermosetting adhesives, does not need to be subjected to an elevated temperature in a heated press in order to convert the formaldehyde-urea reaction product into the insoluble resin. Expensive hot-pressing equipment is not necessary when an aqueous solution of a formaldehyde-urea reaction product is used as an adhesive, because such an adhesive, after being applied, can be converted at ordinary temperatures into an insoluble resinous bond by the action of a hardening agent that renders the composition acid, and thus causes the formaldehyde-urea reaction product to harden or become insoluble.

One of the most important advantages of a formaldehyde-urea adhesive is that it can be used in the form of an aqueous solution. After the aqueous solution of the formaldehyde-urea reaction product has been applied, the product is hardened into an insoluble resin, to produce a waterproof bond.

A formaldehyde-urea adhesive can be shipped most economically in the form of a solid. The user simply adds water to the solid in order to obtain an aqueous solution of the desired consistency. Such a solid is cheaper to ship than a solution, not only because of the bulk and shipping weight represented by the water in the solution, but also because the solid can be shipped in paper sacks, while the solution must be shipped in expensive metal containers.

However, when an ordinary water-soluble formaldehyde-urea adhesive is shipped in granular or powdered form, severe lumping takes place. The resulting lumpy material is hard to get out of the container, and is very difficult to dissolve, so that the lumpiness of the material is regarded as a great disadvantage by users of formaldehyde-urea adhesives.

The principal object of the invention is to provide a formaldehyde-urea adhesive in the form of a finely divided mixture that is free from lumping. More specific objects and advantages are apparent from the description, which merely discloses and illustrates the invention and is not intended to impose limitations upon the claims.

An adhesive embodying the present invention is a finely divided intimate mixture comprising 30 parts of a water-soluble formaldehyde-urea reaction product, from about 1 to about 10 parts of cellulosic material, and not less than about .2 part of pulverulent tricalcium phosphate. Whenever parts are mentioned herein, the parts are by weight. Such a mixture is free from lumping when exposed to the ambient atmosphere for considerable periods of time, provided it is not left out in the rain or subjected to steam or condensed moisture. No lumping of a mixture embodying the invention occurs under ordinary conditions of shipment and use.

Both the cellulosic material and the pulverulent tricalcium phosphate are necessary in an adhesive embodying the invention, and the adhesive will lump if either is omitted. The cellulosic material appears to overcome the somewhat tacky character of the formaldehyde-urea reaction product, and thereby assists in keeping the product in granular or powdered form. The pulverulent tricalcium phosphate appears to coat the particles of formaldehyde-urea reaction product, thus keeping the particles separated, and permitting them to flow under the action of gravity.

The minimum proportion of tricalcium phosphate, i. e., about .2 part for each 30 parts of formaldehyde-urea reaction product, is simply the minimum quantity of tricalcium phosphate that is required to prevent lumping under ordinary conditions of shipment and use. Above this minimum, any desired proportion of tricalcium phosphate may be employed up to a reasonable maximum, such as about 1 part of tricalcium phosphate for each 10 parts of formaldehyde-urea reaction product, but no substantial improvement is obtained by using more than about 1 part of tricalcium phosphate for each 25 parts of formaldehyde-urea reaction product. The pulverulent tricalcium phosphate is insoluble, and remains suspended in the solution of the formaldehyde-urea reaction product after water is added to the dry mixture.

Any cellulosic material may be employed, such as wood flour, paper pulp, wood pulp, alpha-cellulose, or any other material that contains a substantial proportion of cellulose, or consists of granules of another material such as starch, each enclosed in a cellulosic casing. When wood flour is used as the cellulosic material, the preferred proportion of wood flour is from about 1 to about 6 parts for each 30 parts of formaldehyde-urea reaction product.

If the cellulosic particles are less than about .02 m. m. in diameter, they form a substantially stable suspension upon the addition of the water to the dry mixture, i. e., a suspension from which the cellulosic material does not appreciably settle out for several hours. The preferred particle size for the cellulosic material is 1 or 2 microns.

If desired, hydrated cellulosic material may be employed. Cellulosic material can be hydrated by keeping it under water at a temperature approximating the boiling point for an hour or more. Hydrated cellulosic particles tend to stay in suspension somewhat better than non-hydrated cellulosic particles. The use of hydrated cellulosic particles also tends to make the suspension somewhat smoother and easier to spread. On the other hand, the adhesive is more viscous when hydrated cellulosic particles are employed. Such greater viscosity makes it possible to use more water in the adhesive without making it so thin as to soak into the wood or other material to be glued instead of remaining in the glue line.

The present adhesive, like other formaldehyde-urea adhesives, is applied with an agent for hardening the formaldehyde-urea reaction product. The hardening agent may be incorporated in the solution just before the adhesive is applied, or a solution of the hardening agent may be applied to one of the surfaces to be glued while the adhesive is applied to the other. When the two surfaces to which the two solutions have been applied are brought together, the agent that has been applied to one surface acts to harden the formaldehyde-urea reaction product that has been applied to the other surface.

The hardening agent is a substance such as ammonium chloride or ammonium bromide that renders the adhesive acid and thus causes it to harden. The quantity of hardener used is simply an amount sufficient to cause the hardening to take place with the desired rapidity. Since tricalcium phosphate is slightly alkaline, it is necessary to employ a somewhat greater quantity of hardening agent than would be necessary if the tricalcium phosphate were not present. The alkalinity of the tricalcium phosphate is very slight, and is completely compensated for by the use of a small additional quantity of the hardening agent. When ammonium chloride is used as the hardener for a dry adhesive embodying the invention, a suitable amount is approximately 1 part of ammonium chloride for each 50 parts of formaldehyde-urea reaction product in the mixture. The hardening agent is not added until just before the adhesive is to be applied in the form of a solution.

After an adhesive embodying the invention has been incorporated with a hardening agent and applied, the assembled surfaces to be glued can be held at ordinary temperatures while the adhesive hardens. Plywood panels and similar articles may be placed under pressure while the adhesive hardens. A heated press can be used to secure quick hardening of the adhesive, or plywood panels, after being clamped together, may be stored at an elevated temperature to hasten the hardening.

A water-soluble formaldehyde-urea reaction product suitable for use in the present adhesive may be prepared as follows: 1 mol of urea is added to a 37 per cent aqueous solution containing 2 mols of formaldehyde that has been brought to pH 4.5–5.5 by addition of sodium hydroxide. The solution is then gently refluxed long enough (about 1 hour) to carry the reaction to a suitable stage, after which the solution is neutralized. It may then be diluted with water or evaporated under vacuum, if necessary, to bring it to the proper concentration for spray-drying, vacuum drum drying, or any other method of drying that is to be employed. The wood flour or other cellulosic material may be added in finely divided form before or after drying, but the pulverulent tricalcium phosphate should be mixed in, by dry tumbling or another method of mixing, after drying of the formaldehyde-urea reaction product, in order that the tricalcium phosphate may coat the particles of the formaldehyde-urea reaction product.

If a dry mixture embodying the invention is to be stored for a substantial period of time, or shipped a substantial distance, the formaldehyde-urea reaction product should not be appreciably acid. The reaction product will not keep indefinitely in an acid condition, but will harden and become insoluble. A non-acid formaldehyde-urea reaction product can be obtained by neutralizing the initial solution of the product prior to evaporation. A dry mixture that is to be stored or shipped should not contain any added acid ingredient that will cause the formaldehyde-urea reaction product to become hardened.

Various embodiments of the invention may be devised to meet various requirements.

Having described our invention, we claim:

1. A finely-divided intimate mixture free from lumping, for use as an adhesive, comprising thirty parts of a water-soluble formaldehyde-urea reaction product, from about one to about ten parts of cellulosic material, and not less than about two-tenths part of pulverulent tricalcium phosphate.

2. A finely-divided intimate mixture free from lumping, for use as an adhesive, comprising thirty parts of a water-soluble formaldehyde-urea reaction product, from about one to about six parts of wood flour, and not less than about two-tenths part of pulverulent tricalcium phosphate.

3. A finely divided intimate mixture free from lumping, for use as an adhesive, comprising thirty parts of a water-soluble formaldehyde-urea reaction product, from about one to about six parts of wood flour, and about one-half part of pulverulent tricalcium phosphate.

WILLIAM C. DEARING.
KENNETH D. MEISER.